(12) United States Patent
Mueller et al.

(10) Patent No.: US 6,396,912 B1
(45) Date of Patent: May 28, 2002

(54) METHOD AND SYSTEM FOR CONNECTING MULTIPLE DSL MODEMS TO A TELEPHONE LINE

(75) Inventors: A. Joseph Mueller; Richard G. C. Williams, both of San Diego; George F. Landsburg, Nevada City, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/365,094

(22) Filed: Jul. 30, 1999

(51) Int. Cl.[7] ............................................. H04M 11/00
(52) U.S. Cl. ................... 379/93.32; 379/93.31
(58) Field of Search ........................ 379/93.32, 93.31, 379/93.34, 93.28, 93.01, 93.08; 375/222

(56) References Cited

U.S. PATENT DOCUMENTS 5,557,612 A    9/1996  Bingham ................... 370/71
6,111,936 A  *  8/2000  Bremer ..................... 379/28
6,236,675 B1 *  5/2001  Bedingfield et al. ........ 375/222

* cited by examiner

Primary Examiner—Stella Woo
(74) Attorney, Agent, or Firm—McDonnell Boehnen Hulbert & Berghoff

(57) ABSTRACT

A system and method for allowing multiple digital subscriber line modems to access a telephone line. The embodiments employ additional signaling protocols to enable equipped modems to distinguish between initiating and responding signals from initiating customer premise modems and telephone company central office devices. The additional signaling can take many forms that can be detected and used to distinguished signals. Preferably, the signal is a stealth signal as to not interfere with existing communication devices. A variety of application and embodiments are disclosed to enable a solution allowing multiple modems to access a telephone line.

14 Claims, 4 Drawing Sheets

G.lite initialization using G.hs handshake procedure (B) xTU-C initiating

G.lite initialization using G.hs handshake procedure (A) ATU-R initiating

G.lite initialization using fast retrain procedure.

(B) ATU-C initiating

G.lite initialization using fast retrain procedure.

(A) xTU-R initiating (B) xTU-C initiating

METHOD AND SYSTEM FOR CONNECTING MULTIPLE DSL MODEMS TO A TELEPHONE LINE

FIELD OF THE INVENTION

This invention relates to electronic communication systems, and more particularly to a system and method for allowing a plurality of Digital Subscriber Line modems to share the same telephone line.

BACKGROUND OF THE INVENTION

The G.992.2 ("G.lite") ITU recommendation is a communication specification targeting ease of installation and reduced complexity to meet the demands for a mass-deployable digital communication line service to subscribers' homes. As such, it is envisioned that a number of homes may have two or more computers, Internet appliances or other customer premise equipment ("CPE") devices equipped with CPE Digital Subscriber Line ("DSL") or G.lite modems connected to the same customer premise telephone wiring to allow the devices to communicate with the telephone company central office. For example, two users may share a single telephone line to near-simultaneously browse the Internet by exploiting the bursty nature of Internet traffic (using the defined L3 idle mode or the proposed Qmode in G.lite). Either modem may utilize the communication channel when the other modems sharing the line are idle.

Unfortunately, DSL standards currently have no provisions for enabling a plurality of CPE DSL modems to simultaneously connect to the same telephone wire. When establishing a DSL session, the central office's modem uses the same signal to both initiate a session and to respond to a CPE modem's initiating signal. Because the CO uses identical signaling for initiating and responding, if multiple CPE devices with DSL modems are sharing the telephone wiring and one of the CPE modems initiates a session, the central office modem's response signal may be mistaken by all the other DSL modem device sharing the line as an initiating signal. The response signal will trigger all the other CPE modems to begin session establishment signaling. For a home with multiple CPE devices such as two PCs (perhaps one in the home office and one for the children), the users must physically disconnect one PC from the telephone wiring before being able to connect and communicate with the other PC. Not only is this is an inconvenience to users, but it also limits the applications.

For example, in the current G. lite standard no distinction is made between signals used to initiate a G.lite session and signals used to respond to G.lite initiation signals (collectively, wakeup signals). The ATU-C wake-up signals and their sequence are identical, regardless of which end, the CPE modem or the central office modem, initiates the wake-up. Thus if an Asymmetric Digital Subscriber Line ("ADSL") Transmission Unit-Remote ("ATU-R") modem initiates the wakeup with either R-TONES-REQ or R-RECOV, the ATU-C will respond with C-TONES or C-RECOV, as appropriate. If additional ATU-R modems are connected to the same telephone line, all the ATU-R modems sharing the telephone line will detect the C-TONES or C-RECOV signals, eliciting a wake-up response from each of the devices. Multiple CPE device modems participating in the initialization session will result in the failure of the initialization procedure.

Conversely, if the CO initiates a session, all the CPE device modems will also respond. As a result, it will be impossible to establish a connection with a multiple number of CPE DSL modem devices on the line. Current DSL modems' inability to support such a configuration leads to additional cost for extra lines, inconvenience for users, connection failures and may result in additional customer service calls and annoyed consumers. What is needed is a way to overcome such drawbacks to allow multiple DSL CPE modems to connect to a telephone line and not have a failure of the devices to communicate.

SUMMARY OF THE INVENTION

According to the embodiments of the present invention, the ability to allow a multiple number of CPE DSL modem devices to share the same telephone line is provided. Using the present embodiments, a plurality of CPE DSL modems may share the same telephone line.

According to an exemplary embodiment of the invention, a stealth signaling technique provides a mechanism for the telephone company central office ("CO") transmitter to identify and distinguish its wake-up signal as either an initiation or a response signal to a CPE modem initiation signal. If the CO wake-up signal is identified as a response signal to a CPE DSL modem, then only the appropriate CPE modem or Asymmetric Digital Subscriber Line ("ADSL") Transmission Unit-Remote ("ATU-R") that initiated the wake-up signal will respond. All other ATU-Rs sharing the telephone line will not respond. If the CO wake-up signal is an initiation signal, then an arbitration technique such as last ATU-R, master ATU-R, or any ATU-R using a random back-off algorithm, may be performed to determine which ATU-R shall respond.

Preferably, stealth signaling superimposes an additional modulation on the wake-up signal. Stealth signaling may typically be in the form of a small frequency shift or minor amplitude modulation, though can employ any type of modulation, including frequency modulation, phase modulation, amplitude modulation or spread spectrum. Preferably, such signaling would be easily detectable by a modem looking for such signaling, but transparent to other modems on the same telephone line. The modulation parameters are selected such that the stealth signaling remains transparent to those receivers incapable of receiving or unaware of such signaling. Of course, in embodiments where there is a priori knowledge of such signaling distinctions, then it can be assumed that all receivers will be capable of detecting such signaling and it need not be transparent. Preferably, such signaling would be easily detectable by a modem looking for such signaling, but transparent to other modems on the same telephone line.

According to another embodiment of the invention, an out-of-band signal may be utilized to identify the wake-up signal. The out-of-band signal can simply be a signal that is transmitted outside the expected signaling band.

According to another aspect of the invention, a mechanism for limiting the number of CPEs responding to a CO initiation signal is disclosed. Several methods are described herein. According to an embodiment, a random back-off algorithm is used to arbitrate and allow a plurality of CPE devices to contend for the channel. Upon the CPE detecting a CO wake-up initiation signal, the CPE may wait some random or predetermined period of time, determine if another CPE has already responded and if none has, respond itself.

According to yet another aspect of the invention, a busy indicator mechanism is provided for the CPE to determine if another CPE has already responded to the CO initiation. In this embodiment, the CO informs the other CPE devices that the CO has already received a response from a CPE by applying stealth signaling immediately upon detection of a CPE wake-up response. During wake-up signaling, or some appropriate portion thereof, the CO uses stealth signaling to indicate when it is receiving a CPE signal. In essence, the CO is providing a busy indicator to indicate when the upstream link (from the customer premise to the CO) is busy.

The present invention allows multiple CPE devices to share the same telephone line without having to disconnect all the other devices on the line. Multiple CPE modems can be connected to a DSL line and conveniently share the line and have access to the line when the other devices are idle. The cost of having multiple DSL lines for each CPE device wishing to have network access is eliminated. Another benefit of the present embodiments is that they allow for home networking using DRL modems. Obviously, home networking relies on the ability to connect more than one DSL CPE modem to the telephone line.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
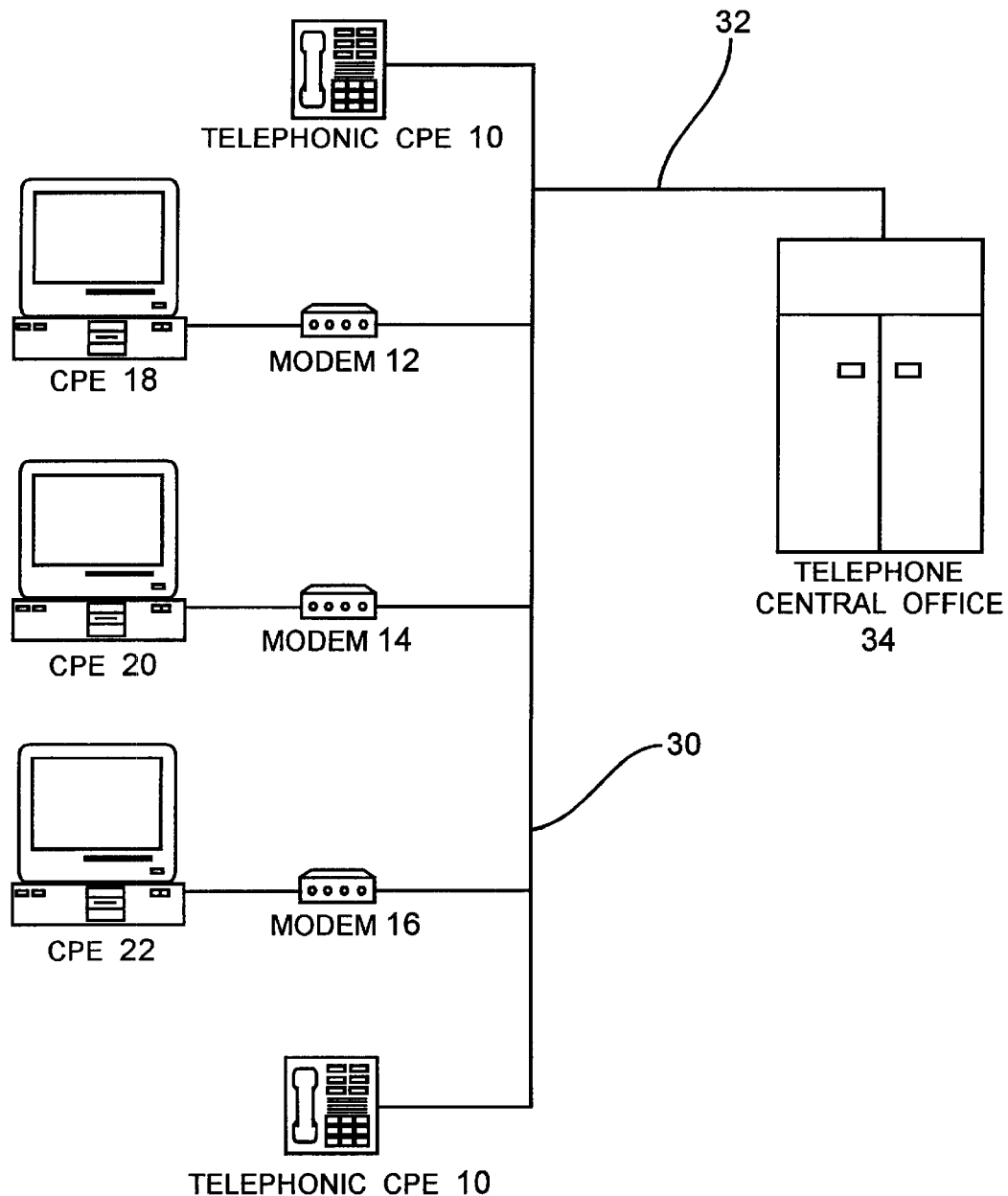
FIG. 1 is a block diagram illustrating an exemplary asymmetric digital subscriber line data transmission system utilizing an embodiment of the present invention.

FIG. 1 is a schematic of a DSL home network according to a preferred embodiment. A number of telephony devices including POTS 10, cordless and digital telephones using a digital signaling protocol to a digital PBX are provided access to the telephone company central office 34 ("CO") via the in-house wiring 30 and subscriber loop 32. In this preferred embodiment, a plurality of DSL modems 12, 14, 16 provide connection access for a plurality of computer devices 18, 20 and 22 to the conventional in-house copper telephone wiring 30 and CO 34. It should be understood that the computer devices 18–22 may be any type of customer premise equipment device such as a file server, network hub, Internet appliance and other equipment such as printers, and computer peripheral devices. The DSL modem devices 12, 14, 16 are also connected through to the conventional in-house copper telephone wiring 30 typically used to carry POTS. Although not shown, frequency band splitters may also be present. The copper telephone wiring 30 typically utilizes existing 24 AWG twisted pair wiring or category 5 shielded twisted pair wire. The existing copper wires 30 function both to interconnect multiple DSL modem devices 12, 14, 16 and also to connect those devices to the local subscriber loop to the telephone company central office 34.

The DSL devices 12, 14, 16 are preferably ADSL modems but may be other interconnection devices. For the purpose of illustration, it is assumed that G.lite compliant ADSL ("Asymmetric Digital Subscriber Line") modems will be used. It should be understood, however, that a variety of other DSL devices could be utilized. In a typical ADSL network, a G.lite modem functions as an ATU-R ("ADSL Transmission Unit-Remote") and communicates with an ATU-C ("ADSL Transmission Unit-Central") at the telephone company central office.

An operating environment for CPE modems or asymmetric network devices 12–16 include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed." It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or may be distributed among multiple interconnected processing systems that may be local or remote to the processing system.

Although the preferred embodiment addresses G.lite specifically, the problem of distinguishing initiating and responding signals and the concepts disclosed herein apply to all DSL technologies, including any combination of DSL technologies which may share a single line. Preferably, session establishment may include using the G.hs protocol or a specially designed subset of tones for signaling.

In the exemplary embodiment, an additional signaling or "stealth signaling" is added to existing signal protocols to distinguish between initiating and responding signals. Stealth signaling is defined here as the process or technique of modulating additional information on to an existing signal such that when receiving the signal, a priori knowledge of the existence of such signaling or modulation is not required. Such modulation is preferably easily detectable by a CPE modem looking for such signaling but transparent to those modems incapable of receiving or unaware of such signaling. One way of ensuring this, is to restrict such modulations to within the design tolerances of the original signal. These stealth modulation techniques exploit the fact that simple energy detectors are all that is typically required at the CPE to detect the wake-up signals. These techniques exploit the fact that simple energy detectors are all that is required at the ATU-R to detect the wake-up signals. Alternatively, generate and demodulate the stealth signals, additional signal processing may also be implemented according to the particular nature of the stealth signaling.

Figure 2A:
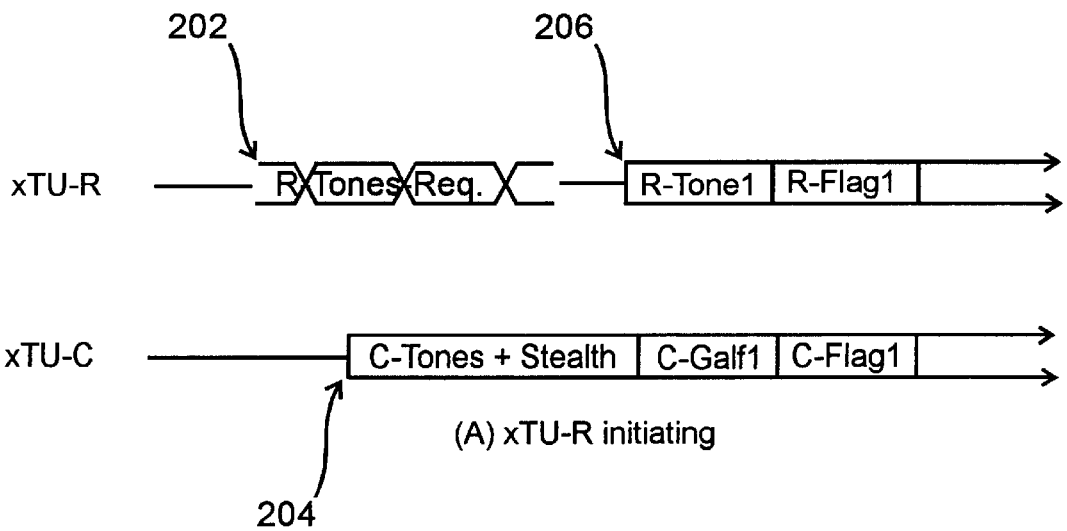
FIGS. 2A and 2B show initialization timing diagrams between ATUs in the system of FIG. 1 using the G.hs procedure.
Figure 3A:
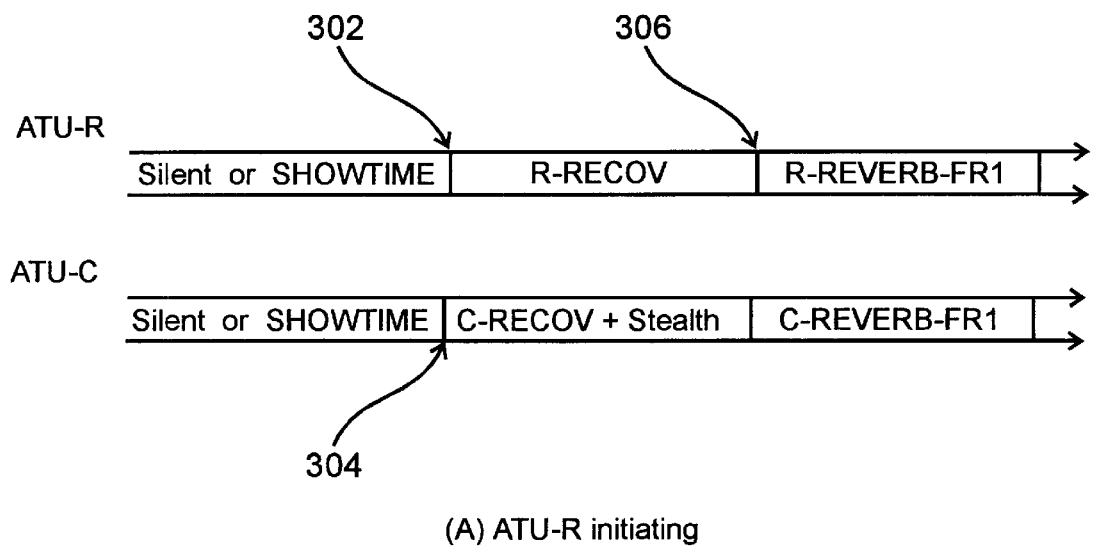
FIGS. 3A and 3B show initialization timing diagrams between ATUs in the system of FIG. 1 using the G.lite fast retrain procedure.

Referring now to FIGS. 2A and 3A, two examples of stealth signaling techniques are provided and are equally applicable to both the G.hs C-Tones and G.lite C-RECOV signals typically used for wake-up signaling (other modulation schemes are equally possible). FIG. 2A shows G.lite initialization using G.hs handshake procedure for the xTU-R initiating the establishment session. As seen in FIG. 2A, the xTU-R initiates with the R-Tones-Req at 202. At 204, the xTU-C responds with the C-Tones plus a stealth signal to be detected by the initiating xTU-R at Step 206 and any other DSL modems sharing the telephone line. This stealth signal indicates to all modems that only the initiating xTU-R shall respond. It should be understood, that the term 'xTU-R#' as used herein uses an x to denote any type of DSL modem, ie. ATU-R for ADSL, VTU-R for VDSL, HTU-R for HDSL, SHTU-R for SHDSL, etc.

Similarly, FIG. 3A shows G.lite initialization using the fast retrain procedure for the ATU-R initiating the establishment session. As seen in FIG. 3A, the ATU-R initiates with the R-RECOV at 302. At 304, the ATU-C responds with the C-RECOV plus a stealth signal to be detected by the initiating ATU-R at 306 and any other ATU-R modems sharing the telephone line. This stealth signal indicates to all modems that only the initiating ATU-R shall respond. As can be seen, the additional signaling maintains the existing signaling protocols with the stealth signals merely added to the existing signals. It should be understood that in other embodiments, the additional signaling added to the existing protocol signals need not be of a stealth nature. The stealth nature of the signaling is advantageous, however, for backwards compatibility to not confuse devices without the capability.

The stealth signaling added to the wake-up signals can take many different forms such as a frequency shift or minor amplitude modulation though can employ any type of modulation, including frequency modulation, phase modulation, amplitude modulation or spread spectrum. Such signaling would be easily detectable by a modem looking for such signaling, but transparent to those modems on the same telephone line that are incapable of receiving or unaware of such stealth signaling. The modulation parameters are preferably selected such that the stealth signaling remains transparent to those receivers incapable of receiving or unaware of such signaling.

Using frequency modulation, a binary sequence is modulated onto the wake-up signal by, for example, applying a positive frequency offset to represent a binary 0 and a negative frequency offset to represent a binary 1. The frequency offsets are relative to the carrier frequencies of the wake-up signal and are within the specified (or implicit) frequency jitter and frequency tolerance of the wake-up signal. Incorporating direct sequence or frequency hopping spread spectrum techniques may increase the reliability. For example, a positive offset can be applied for a time period and then a negative offset for another time period (normally the same amount of each) and then toggle between the two offsets. Amplitude modulation can also be used where a binary sequence is modulated onto the wake-up signal. For example, the amplitude modulation is preferably a constant modulation such as a low amplitude, relatively low frequency, sine wave superimposed on the appropriate tone similar to the amplitude modulation applied to ANS of V.32 to produce ANSam of V.8—a 20% 15 Hz amplitude modulation on an 2100 Hz tone. See ITU-T Recommendation V.8 (1994), Procedures for starting sessions of data transmission over the general switched telephone network. The amplitude offsets are relative to the average amplitude of the wake-up signal and are within the specified (or implicit) amplitude variations of the wake-up signal. Incorporating direct sequence spread spectrum techniques may increase the reliability. For this particular application, only a single bit of binary information is required to distinguish between initiating and responding signals. Because of the significantly greater capacity that is available, significant redundancy may be applied to allow for improved reliability and/or greater degrees of stealth.

In an alternate embodiment of the invention, an out-of-band signal is utilized to indicate and distinguish between an initiating or responding signal. An out-of-band signal is simply a signal that is transmitted outside the expected signaling band. For example, G.hs defines a fixed set of N discrete tones that are used for session establishment and communication. One or more additional tones that are currently not used by G.hs can be defined to relay the initiating or responding information (i.e. if it is a responding signal, energy will be present on these additional tones). To avoid confusion for equipment that does not support this additional tone set, the tone set may be transmitted at a reduced power level. To detect the out-of-band signaling, filters may have to be adjusted accordingly to allow the out-of-band signals to be received.

Figure 2B:
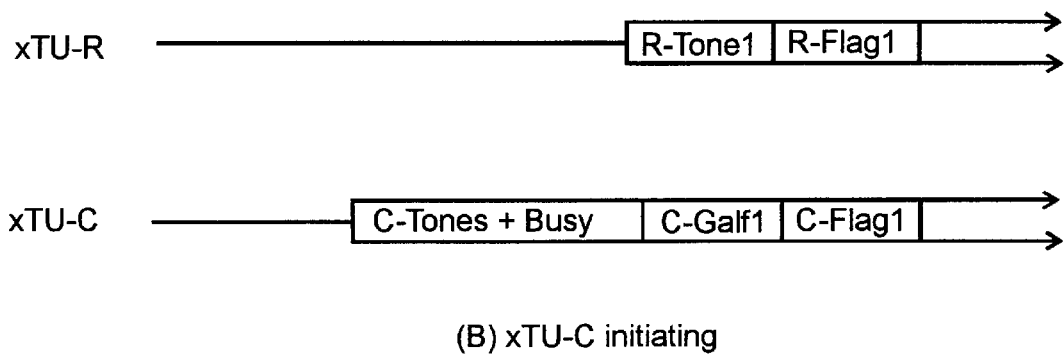
Figure 3B:
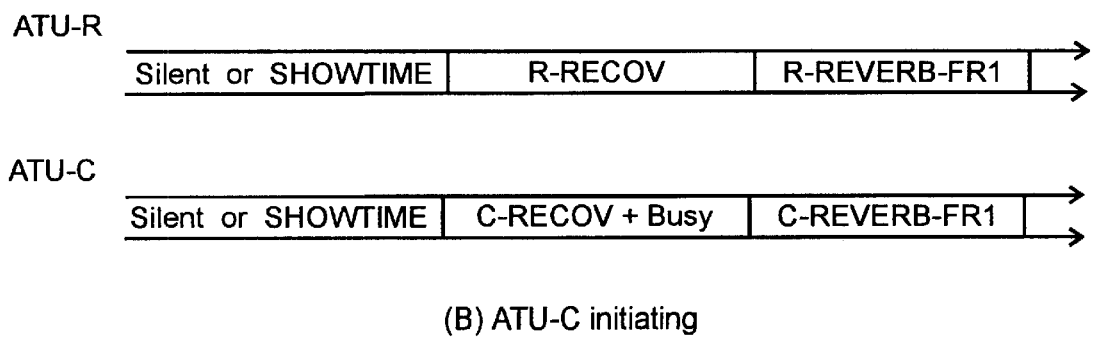

In addition to a CPE modem initiating a session, the CO modem may also initiate a session to one of the plurality of CPE modem or ATU devices as shown in FIGS. 2B and 3B. The plurality of CPE modems must be able to distinguish among them which CPE modem is the intended recipient of the session initiation. Disclosed below is a number of embodiments and alternatives.

A direct solution would be to simply assign a master CPE modem that would always respond to a CO wake-up initiation signal. Of course, the master CPE device would not respond to any CO wake-up response signals unless it had itself initiated the wake-up. For some configurations, this approach may indeed be a suitable solution, however, it does have significant limitations. It relies on the master CPE always being able to establish a session (i.e. powered) and it must assume that the CO always wishes to establish a connection with the master CPE. An improvement would have the master CPE respond to the wake-up signaling but at some point, passing the channel to the appropriate CPE device if necessary.

According to a preferred embodiment, a master CPE device is not assigned, rather a random back-off algorithm is utilized to allow all CPE to contend for the channel. Thus, upon the CPE modem detecting a CO wake-up initiation signal, the CPE modem waits predetermined or random period of time, determines if another CPE has already responded and if none has, responds itself to the initiation. In FIG. 4, t1, t2 and t3 indicate the duration of each of the random back-off periods for each CPE as described with respect to the drawings. The random back-off algorithm would restrict each CPE from responding to the CO's initiation signal until the expiry of a randomly generated time duration. Each CPE is further restricted from responding to the CO's initiation, beyond the timeout, until they have determined that no other CPE has already responded. To implement this arbitration scheme, a mechanism for the CPE modes to determine if another CPE has already responded is utilized. Preferably, the CO informs the other CPE modems that a response has been received by applying stealth signaling, as described above, immediately upon detection of a CPP wake-up response.

Figure 4A:
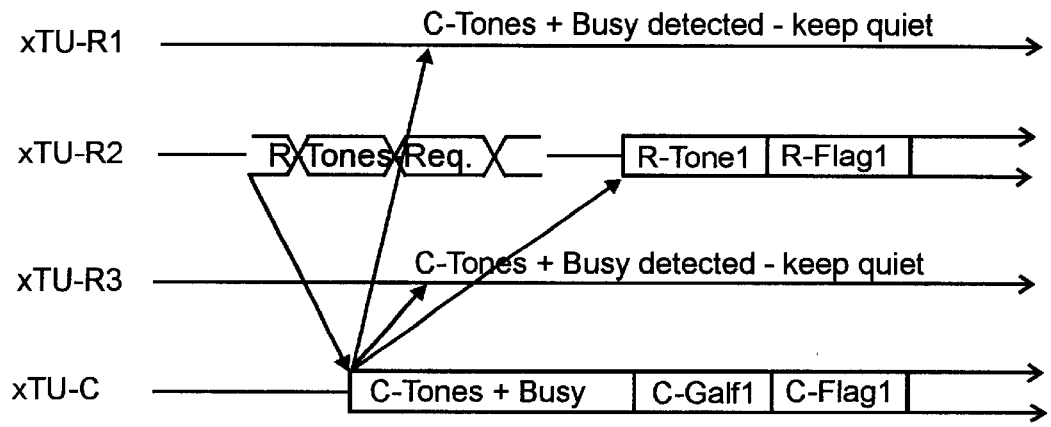
FIGS. 4A and 4B show initialization timing diagrams between a plurality of ATUs in the system of FIG. 1 to illustrate the busy indicator.
Figure 4B:
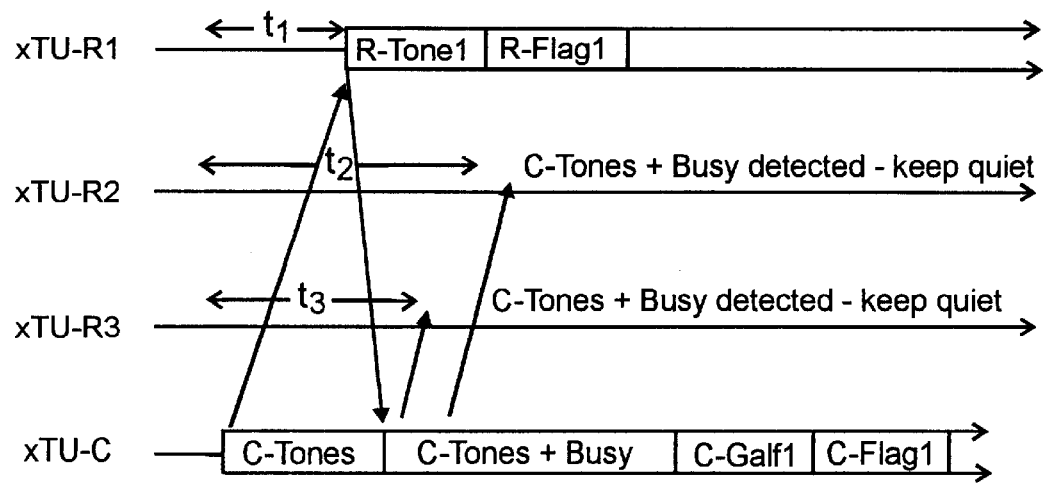

Given the stealth signaling disclosed herein and the arbitration back-off embodiment disclosed above, the solution for enabling multiple CPE devices to connect to a telephone line can be realized. During wake-up signaling, or some appropriate portion thereof, the CO may use stealth signaling to indicate when it is receiving a CPE modem signal as shown in FIGS. 4A and 4B. Thus, the CO is capable of indicating when the upstream link (from the customer premise to CO) is busy. This generalized form using stealth signaling as a busy indicator from the CO modem addresses both the CPE and CO initiated wake-up signaling cases and provides the ability to have multiple CPE modems sharing the same telephone line.

FIGS. 4A–4B illustrates the use of the busy indicator applied to the G.hs initialization procedure with multiple CPE devices xTU-R1, xTU-R2, and xTU-R3. Again, the term 'xTU-R#' as used herein uses an x to denote any type of DSL modem, ie. ATU-R for ADSL, VTU-R for VDSL, HTU-R for HDSL, SHTU-R for SHDSL, etc. G.hs is either already being used or has been agreed to be used for all these aforementioned flavors of DSL and thus this technique applies equally well to all of them. The present embodiment focuses on G.lite simply because it has an idle mechanism defined and because it uses a Fast Retrain as an additional way to initiate a session. If other future standards define alternate initiation schemes, this embodiment should apply.

CPE initiation is shown in FIG. 4A and CO initiation in FIG. 4B. In both cases, a contention period exists between the time initiation and response signals are exchanged where collisions between wake-up signals may occur. For the first case, if two xTU-Rs wish to initiate a session near simultaneously, the initiation will fail but a retry (perhaps with another random period) can be performed to try again. The likelihood of two or more xTU-Rs wishing to initiate a connection within this period can be expected to be very small. For the second case shown in FIG. 4B, the probability of collision will be proportional to the typical spread in the random back-off times. Thus, unless long back-off times are used, collisions may be more frequent.

In FIG. 4A, xTU-R2 is instructed via the higher layers (not shown) to initiate a DSL connection. Seeing no C-Tones and thus no Busy tone, it initiates with R-Tones-Req. The xTU-C, upon detecting R-Tones-Req, responds with C-Tones including the stealth Busy signal to indicate that the upstream channel is occupied or busy. The other DSL modems, xTU-R1 and xTU-R3, detect C-Tones and recognize the Busy signal to indicate that another xTU-R is currently engaging the xTU-C and thus remain quiet. The xTU-R2, upon detecting the C-Tones, continues with the G.hs sequence.

In FIG. 4B, the xTU-C is instructed via the higher layers to initiate a DSL connection and begins transmitting C-Tones. The xTU-R modems connected to the same line detect C-Tones and failing to detect a Busy signal recognize that the upstream channel is not yet occupied or busy. As a result, xTU-R1, xTU-R2 and xTU-R3 wait either some predetermined or random time, t1, t2 and t3, respectively during which they remain quiet. Upon expiry of the timeout, each xTU-R monitors the C-Tones signal for presence of the Busy signal. xTU-R1, seeing no Busy signal upon expiry of the t1 timer, immediately responds with R-Tone1 signal. The xTU-C detects this signal and immediately applies the Busy signal. Upon expiry of the t1 and t3 timers, the xTU-R1 and xTU-R3 monitor the C-Tones signal, detect the Busy signal and recognize the upstream channel is now occupied or busy and thus remain quiet.

Referring to FIG. 4B, to reduce the likelihood of collisions when an xTU-C initiates the handshake, biased timeouts may be used. One technique could mandate a quiet period that is inversely-proportional to the idle time of each particular xTU-R. For example, an xTU-R that has been idle for 15 minutes must wait a short time while an xTU-R that has been idle for four hours must wait a longer time. The preferred embodiment would be for all xTU-Rs except the last xTU-R to have connected to use a random back-off. The last xTU-R to have connected would not use any back-off and would simply respond as soon as the CO's signal is detected.

For G.lite, additional work is required to support multiple CPE modems because of the profiles used by G.lite. G.lite supports up to 16 profiles, where each profile contains the modem operating parameters corresponding to a particular G.lite session. A copy of these profiles is stored at both the ATU-R and the ATU-C. These profiles are necessary for fast recovery from idle periods or sudden changes in the channel conditions. Thus, during fast retrain, a modem will sense the channel and attempt to select the profile that best matches the channel condition.

Unfortunately, however, current ATU-Cs do not have the ability to store multiple profile sets, each belonging to a different one of a plurality of ATU-Rs that may be connected to the telephone line. Furthermore, ATU-Cs do not have the capability of identifying or addressing particular ATU-Rs in order to identify profiles as belonging to a particular ATU-R.

A number of different embodiments may be used to address the issues raised by profiles. According to a first embodiment, if the initiating ATU-R was not the last ATU-R to have established a G.lite session with the CO, then assume the CO's profiles correspond to the last ATU-R to have connected with the CO. The existing G.lite "erase all stored profiles command" is issued to erase all stored profiles (an existing G.lite command). The erase command eliminates the profiles that are not appropriate for the current ATU-R. All profiles would have to be re-determined through training when required. To reduce the retraining time required to determine the profiles, a mechanism can be provided for reloading the profiles from the ATU-R to the ATU-C during SHOWTIME. For example, the AOC or EOC overhead channels could be used to carry the ATU-R profiles to the ATU-C.

According to another embodiment of the invention using a home network or other means of communications between ATU-Rs, a set of universal profiles for the ATU-Rs are determined. All ATU-Rs would then share this single set of profiles. To compensate for channel variations specific to a particular ATU-R, a set of profile modification commands may be used to 'personalize' the universal profiles.

According to another alternate embodiment the ATU-C determines and stores a single set of universal profiles. For example, ATU-R1 establishes the first session and during the course of the session, establishes profile number 1. Next ATU-R2 establishes a session and eventually a store profile command is issued. The ATU-C would either assign a new profile number 2 or would indicate that the current operating parameters match closely with the first profile and simply transmit back to the ATU-R the differences between the two profiles. During subsequent retrains, the ATU-R can select profile number 1 along with the differences using profile modification commands. This requires the ATU-C recognize the individual ATU-Rs in order to categorize the profiles.

According to another alternate embodiment, profile number management is performed where profile numbers are dynamically assigned and reassigned to each ATU-R. For example, if the CO supports 8 profiles and there are two ATU-Rs, each ATU-R may be assigned 4 profile numbers. Segmentation of the profiles between all the different ATU-R allows a limited number of unique profiles to be stored for each ATU-R.

The present invention allows multiple CPE devices to share the same telephone line without having to disconnect all the other devices on the line. Multiple CPE modems can be connected to a DSL line and conveniently share the line and have access to the line when the other devices are idle. The cost of having multiple DSL lines for each CPE device wishing to have network access is eliminated. Another benefit of the present embodiments is that they allow for home networking using DSL modems. Obviously, home networking relies on the ability to connect more than one DSL CPE modem to the telephone line.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only. The illustrated embodiments should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A method for accommodating a plurality of digital subscriber line ("dsl") modems on a common telephone wire connection, comprising:

initiating a DSL session between a customer premise modem and a central office with an initiating signal;

modulating an additional signal superimposed on a responding signal, the additional signal distinguishing the responding signal from an initiating signal; and distinguishing the responding signal from the initiating signal based on the additional signaling.

2. The method of claim 1 wherein the additional signal comprises a stealth signal wherein the stealth signal is transparent to modems not capable of detecting the signal.

3. The method of claim 1 wherein the modulating an additional signal comprises an amplitude modulation.

4. The method of claim 3 wherein the amplitude modulation comprises a 20% amplitude modulation.

5. The method of claim 1 wherein the modulating an additional signal comprises a frequency modulation.

6. The method of claim 5 wherein the frequency modulation comprises a positive offset and negative offset.

7. The method of claim 1 wherein the additional signal on the responding signal comprises a busy indicator from a central office device.

8. A method for accommodating a plurality of digital subscriber line ("DSL") modems on a common telephone wire connection, comprising:

initiating a DSL session between a customer premise modem and a central office with an initiating signal;

transmitting an out-of-band signal to distinguish the responding signal from an initiating signal; and distinguishing the responding signal from the initiating signal based on the additional signaling.

9. The invention of claim 8 wherein the out-of-band signal comprises an additional tone currently not used by initialization.

10. The invention of claim 8 wherein the out-of-band signal is transmitted at a reduced power level.

11. A method for accommodating a plurality of digital subscriber line ("DSL") modems on a common telephone wire connection, comprising:

initiating a DSL session to a customer premise modem with an initiating signal;

receiving a response signal from a customer premise device; and transmitting an additional signal superimposed on a further responding signal, the additional signal signifying a busy indicator that a response signal has been received from customer premise device.

12. The method of claim 11 wherein the additional signal comprises a stealth signal.

13. The method of claim 11 wherein a back-off algorithm is implemented to arbitrate contention issues.

14. The method of claim 11 wherein a timeout wait is employed before responding to the initiating signal.

* * * * *